No. 853,136. PATENTED MAY 7, 1907.
A. TAYLOR.
ADJUSTING DEVICE FOR CAMERA LUCIDAS.
APPLICATION FILED AUG. 21, 1906.
2 SHEETS—SHEET 2.
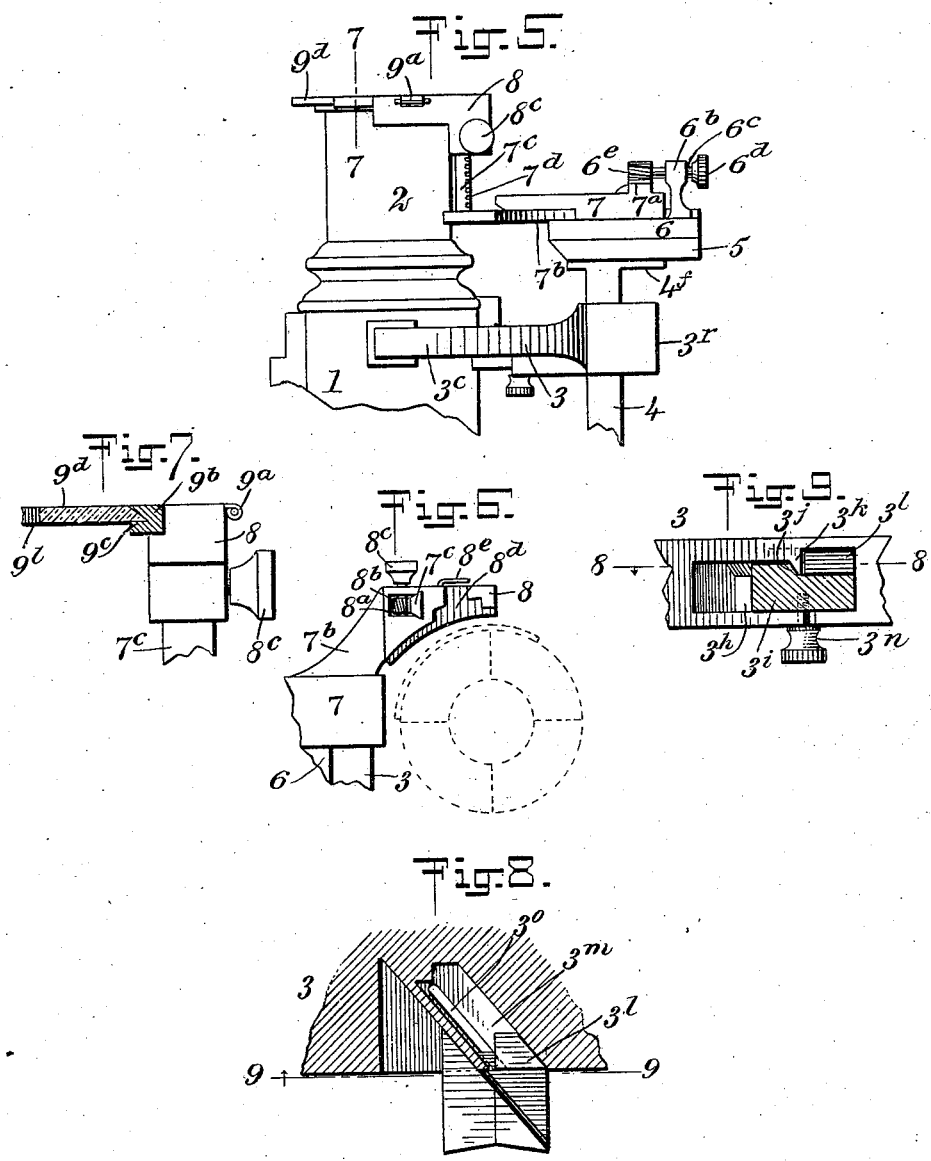
WITNESSES
INVENTOR
Alexandrina Taylor
BY Munn & Co
ATTORNEYS

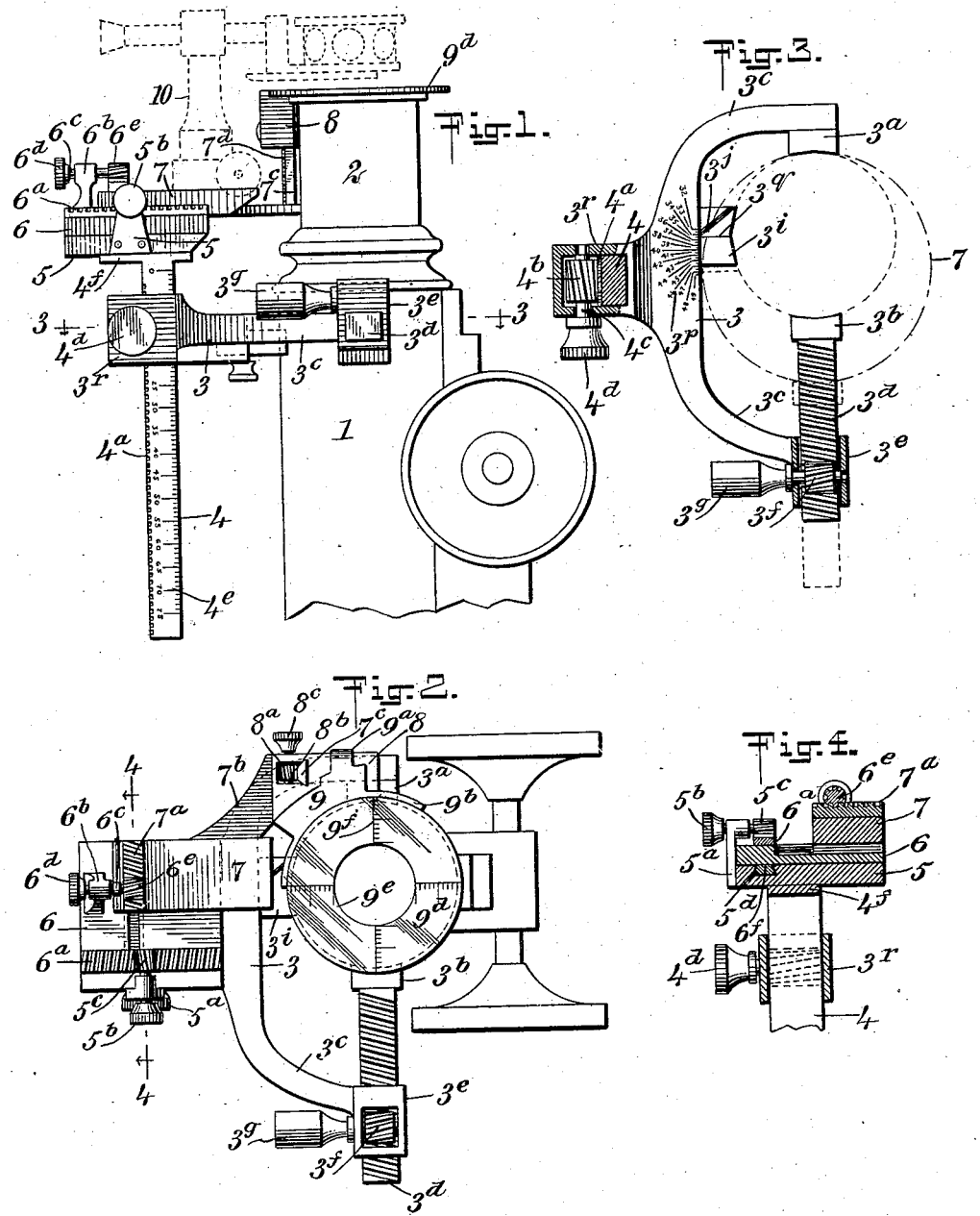

UNITED STATES PATENT OFFICE.

ALEXANDRINA TAYLOR, OF NEW YORK, N. Y.

ADJUSTING DEVICE FOR CAMERA LUCIDAS.

No. 853,136.      Specification of Letters Patent.      Patented May 7, 1907.

Application filed August 21, 1906. Serial No. 331,481.

*To all whom it may concern:*

Be it known that I, ALEXANDRINA TAYLOR, a citizen of the United States, and a resident of the city of New York, borough of Manhattan, in the county and State of New York, have invented a new and Improved Adjusting Device for Camera Lucidas, of which the following is a full, clear, and exact description.

My invention has for its principal object to provide means adapted to adjustably secure a camera-lucida to microscopes of various sizes.

In the devices now in use camera-lucidas are generally secured fixedly to a clamping collar which is fastened to the draw tube of a microscope. Such clamping collars are generally not adjustable to draw tubes of different dimensions and, therefore, separate camera lucidas and clamps fixedly secured thereto are required for each different size of draw tube. As the camera lucidas are secured to the draw tube of the microscopes it is necessary to remove the eye piece from the draw tube in order to attach the clamping collar connected with the camera lucida, and in most instances it is necessary to slide the clamping collar along the draw tube of the microscope with the hands to find a proper elevation for the camera before clamping the camera to the draw tube. At times, moreover, it becomes necessary to remove the draw tube from the microscope in order to insert a compensating eye piece or other device in its place, and in such instances the camera lucida must be detached from the draw tube and be again attached to the device substituted in its stead, with the usual experimenting to adjust the camera lucida.

My invention, therefore, has for its object to dispense with such inconveniences and disadvantages found in the devices now in general use. This I accomplish by means of an adjustable clamp adapted to be attached to the body tube of a microscope, instead of to the draw tube, and mechanism mounted upon said clamp, adapted to support a camera lucida, and adjust the axis of said camera relatively to the axis of the microscope, as illustrated in the accompanying drawings, in which drawings like characters of reference indicate like parts throughout the views, and in which Figure 1 is a side elevation of a device embodying my invention attached to a microscope, and supporting a camera lucida indicated in dotted lines; Fig. 2 is a plan view of the parts shown in Fig. 1 with the camera lucida removed; Fig. 3 is a horizontal section taken on the line 3—3 of Fig. 1; Fig. 4 is a vertical section taken on the line 4—4 of Fig. 2; Fig. 5 is a side elevation of the parts shown in Fig. 1 viewed from the opposite side thereof; Fig. 6 is a fragmentary plan of a shelf extending outward from one of the stages; Fig. 7 is a vertical fragmentary section of a yoke supporting an adjusting plate, taken on the line 7—7 of Fig. 5; Fig. 8 is a horizontal section taken on the line 8—8 of Fig. 9; and Fig. 9 is a vertical section taken on the line 9—9 of Fig. 8.

As illustrated in the drawings, 1 represents the body of a microscope of ordinary construction, having a draw tube 2 secured to said body. A clamp 3 is adjustably secured to the body 1 of the microscope, and supports a vertical standard 4 adjustable on said clamp. A first stage 5 is fixedly secured to the upper end of the standard 4, and supports a second stage 6 which is adjustable transversely of the first stage. A third stage 7 is mounted upon the second stage 6 and adjustable lengthwise thereof. An auxiliary stage 8 is mounted upon the third stage 7 and supports an adjusting plate $9^d$ which is adapted to extend over the eye piece of a microscope. A camera lucida 10 of any desired construction may be supported on the third stage 7, and by means of such adjustment the axis of the camera lucida may be brought into coincidence with the axis of the microscope. The clamp 3 is provided with oppositely disposed jaws $3^a$ and $3^b$. The jaw $3^a$, is rigidly secured to one of the arms $3^c$ of the clamp, while the opposite jaw $3^b$ is attached to a rack $3^d$ having its bearing in a rectangular sleeve $3^e$ formed on the end of the other arm $3^c$ of the clamp. A pinion $3^f$ is mounted upon a spindle which is journaled in the rectangular sleeve $3^e$ and provided on its outer end with a head $3^g$ adapted to rotate the pinion $3^f$ and move the toothed rack $3^d$ in the direction of its length. The inner edge of the yoke 3 is provided with a recess $3^h$ shown in Fig. 9, adapted to receive a clamping jaw $3^i$ movable transversely of the clamp 3 in a diagonal line. The jaw $3^i$ is provided on its upper surface with an inclined wall $3^j$ extending from the front to the rear of the jaw $3^i$ in a diagonal line, as shown in Figs. 3 and 9. A rib $3^k$ is formed on the upper wall of the recess $3^h$ and extends diagonally across said recess and bears against the inclined wall $3^j$ of the jaw $3^i$, and thereby guides the transverse diagonal movement of said jaw $3^i$ in the recess $3^h$. A vertical lug $3^l$ is formed on the rear end of the jaw $3^i$, which is adapted to travel in a sub-recess $3^m$ formed in the body of the clamp and opening into the recess $3^h$. As the jaw $3^i$ is drawn forward transversely of the clamp 3, the lug $3^l$ comes in contact with the forward wall of the recess $3^m$ and thereby stops the forward movement of said jaw and prevents the jaw from being removed from the recess $3^h$. A set screw having a milled head $3^n$ is attached to the under side of the jaw $3^i$ and moves in a slot $3^o$ formed in the under side of the clamp 3, as shown in Fig. 8. By means of such construction the clamp 3 is adapted to be secured to the body tube of different microscopes varying in size. In adjusting the clamp to a microscope the jaw $3^a$ is first brought in contact with the body tube of the microscope; the sliding jaw $3^i$ may then be moved diagonally across the clamp 3 until its face comes in contact with said tube of the microscope. The jaw $3^b$ is then moved inward by means of the pinion $3^f$ engaging the rack $3^d$ which supports said jaw, thereby securing the clamp firmly to the microscope. The upper surface of the clamp 3 is provided with a graduated scale $3^p$ adapted to indicate the diameter of the tube which may be secured by the central jaw $3^i$, when its center, as indicated by the transverse line $3^q$, registers with the different markings of the scale. The clamp 3 is also provided with a rectangular sleeve $3^r$ adapted to receive the standard 4 having a toothed rack $4^a$ formed on its edge. A pinion $4^b$ is mounted upon a spindle $4^c$ journaled in the sleeve $3^r$, and is operated by means of a milled head $4^d$ secured to the end of the spindle $4^c$, whereby to raise or lower at will the vertical standard 4. A scale $4^e$ is formed on the side of the standard 4, the markings of which are adapted to register with the upper or lower surface of the annular sleeve $3^r$, and thereby indicate the position of the standard 4 relatively to the clamp 3. A plate $4^f$ is formed on or attached to the upper end of the standard 4, and the stage 5 is rigidly secured to the plate $4^f$. A bracket $5^a$ is attached to the stage 5, in which bracket is journaled a spindle provided on one end with a milled head $5^b$, and on its opposite end with a pinion $5^c$. The pinion $5^c$ engages a rack $6^a$ disposed transversely of the second stage 6, and moves said stage 6 toward or away from the microscope, as desired. A beveled rib or tongue $6^f$ is formed on the under side of the stage 6, and engages a beveled groove $5^d$ formed on the upper surface of the stage 5, so as to hold said stages in their relative positions and enable the stage 6 to slide transversely of its length on the stage 5. A bracket $6^b$ is attached to the stage 6, in which is journaled a spindle $6^c$ having on its outer end a milled head $6^d$, and on its inner end a pinion $6^e$ which engages a rack $7^a$ formed on the stage 7, by means of which the stage $7^a$ is adapted to be adjusted transversely of its length and lengthwise of the stage 6.

A camera lucida may be secured to the stage 7, and when so secured may be adjusted relatively to the microscope in the manner already described, the vertical standard 4 providing for the vertical adjustment, the stage 6 providing for an adjustment in a line radial to the microscope, and the stage 7 providing for an adjustment in a line transversely to said radial line. An arm $7^b$ extends outward from the stage 7 preferably in a curved line, and is provided on its outer end with a standard $7^c$ preferably provided with a rack $7^d$. The auxiliary stage 8 is provided with a recess $8^a$ adapted to receive the standard $7^c$, and a pinion $8^b$ which engages said rack is secured to the inner end of a spindle journaled in the auxiliary stage 8. A milled head $8^c$ is secured to the opposite end of said spindle, and is adapted thereby to rotate the pinion $8^b$, and raise and lower the auxiliary stage 8 on the standard $7^c$. The upper surface of the auxiliary stage 8 is provided with a recess $8^d$, the inner portion of which preferably extends in the arc of a circle, as shown in Fig. 6. A hinged pin $8^e$ is secured to the stage 8, to which is hinged the end $9^a$ of a yoke 9 having an arc flange $9^b$ formed on its inner portion. The contour of the main portion of the yoke 9 corresponds with that of the recess $8^d$ of the auxiliary stage 8, and is of similar dimensions so that such portion of the yoke 9 will exactly fill the recess $8^d$ with the upper surface of the yoke 9 even with the upper surface of the auxiliary stage 8. The arc flange $9^b$ of the yoke 9 is provided with a curved angular recess $9^c$, as shown in Fig. 7, adapted to clamp the edge of an adjusting plate $9^d$ secured to said flange by cement or other suitable means. The central portion of the adjusting plate $9^d$ is provided with an aperture $9^e$, and the upper surface of said plate is provided with scales $9^f$ arranged in radial lines quartering said plate. The plate $9^d$ is made of glass or other transparent material, and when the parts are in position and attached to a microscope the plate $9^d$ extends over the eye piece of the microscope with the eye lens arranged within the aperture $9^e$ of the adjusting plate. Said aperture $9^e$ of the adjusting plate is large enough to be free of any lens when properly adjusted. The position of the eye piece of the microscope is read by its margin, and not by the eye lens, as the eye lenses are of varying sizes according to the magnifying power of the eye piece. The margin of the eye piece is apparent through the transparent body of the adjusting plate 9$^d$, and its position in relation to said adjusting plate, as indicated by the scales 9$^f$ marked on said plate, indicates the proper direction in which said plate, together with the auxiliary stage 8 and the stage 7 upon which it is mounted, are to be moved so as thereby to bring the axis of the camera lucida secured to the stage 7 into coincidence with the axis of the microscope. The adjusting plate 9$^d$ may be turned upward on the hinged end 9$^a$ of the yoke 9 so as to be out of alinement with the draw tube of the microscope, and permit the eye piece and draw tube to be removed when desired. The entire auxiliary stage 8 may be detached from the standard 7$^e$ of the stage 7 by turning the milled head 8$^c$ until the pinion 8$^b$ is free from the rack 7$^c$ of the standard 7$^d$ of the upper stage 7. The arm 7$^b$ of the stage 7 is spaced at a considerable distance from the draw tube 2 of the microscope, as indicated in Fig. 6, thereby enabling a device larger in diameter than the draw tube 2 to be connected with the body tube of a microscope without disturbing the adjustment of the camera lucida.

Having thus described my invention, what I claim as new and desire to secure by Letters Patent is:

1. The combination with an adjustable clamp adapted to be attached to the body tube of microscopes having different diameters, of a standard mounted on said clamp, and a stage mounted on said standard adapted to support a camera lucida and adjustable vertically relatively to said clamp, substantially as shown and described.

2. The combination with a clamp adapted to be adjusted to the body tube of microscopes having different diameters, of a stage mounted on said clamp adjustable vertically relatively thereto and adapted to support a camera lucida, substantially as shown and described.

3. The combination with a clamp adapted to be adjusted and secured to the body tube of microscopes having different diameters, of a standard mounted on said clamp and provided with a measuring gage, and a stage mounted on said standard adapted to support a camera lucida and adjustable vertically relatively to said clamp, substantially as shown and described.

4. The combination with a clamp, provided with oppositely disposed clamping jaws, one of which is adjustable relatively to the other, and with a recess intermediate said jaws having a guideway extending diagonally therein, and provided with a registering gage arranged over said recess, a clamping jaw adapted to move diagonally in said recess and provided with a gage line adapted to register with the gage of said clamp, a standard, and a stage adapted to support a camera-lucida mounted on said standard and adjustable vertically relatively to said clamp, substantially as shown and described.

5. The combination with an adjustable clamp, of a standard mounted on said clamp, a stage mounted on said standard and adjustable transversely thereof, and a second stage adapted to support a camera lucida and adjustable transversely of the first stage, substantially as shown and described.

6. The combination with an adjustable clamp, of a standard mounted on said clamp, a stage mounted on said standard and adjustable transversely thereof, a second stage adapted to support a camera lucida and adjustable transversely of the first stage, and an auxiliary stage mounted upon the second stage and provided with a graduated plate having a central aperture, substantially as shown and described.

7. The combination with an adjustable clamp, of a standard mounted on said clamp and adjustable vertically thereon, a stage mounted on said standard and adapted to support a camera lucida, and an auxiliary stage having a transparent graduated plate provided with a central aperture and hinged to said auxiliary stage, substantially as shown and described.

8. The combination with an adjustable clamp, of a standard mounted on said clamp and adjustable vertically thereon, a stage mounted on said standard adapted to support a camera lucida, and an auxiliary stage mounted upon said camera stage, adjustable vertically thereon and provided with a transparent graduated adjusting plate, provided with a central aperture, substantially as shown and described.

9. The combination with a clamp provided with oppositely disposed clamping jaws, one of which is adjustable relatively to the other, and with a recess intermediate said jaws having a guideway extending diagonally therein, a clamping jaw adapted to move diagonally in said recess, a standard adjustable on said clamp, and a stage adapted to support a camera-lucida mounted on said standard and adjustable vertically relative to said clamp, substantially as shown and described.

10. The combination with a clamp provided with oppositely disposed clamping jaws, one of which is adjustable relatively to the other, and with a recess intermediate said jaws having a slot and a guide extending diagonally across said recess, a clamping jaw adapted to move diagonally in said recess, means for locking said jaw in position on the clamp, a standard mounted on said clamp, and a stage adapted to support a camera-lucida mounted on said standard and adjustable relatively to said clamp, substantially as shown and described.

11. The combination with an adjustable clamp, of a standard mounted on said clamp, a stage mounted on said standard and adapted to support a camera-lucida, an auxiliary stage mounted on said camera stage and provided with a transparent adjusting plate adapted to be arranged over the eye-piece of a microscope and provided with gage marks arranged in radial lines adapted to indicate the position of said eye piece relatively to said gage, substantially as shown and described.

12. The combination with a telescope having a body tube, and a draw tube, of a clamp adapted to be adjustably secured to the body tube of microscopes of different diameters, a vertically adjustable standard mounted on said clamp, and means for adjusting a camera lucida relatively to the axis of said microscope, substantially as shown and described.

In testimony whereof I have signed my name to this specification in the presence of two subscribing witnesses.

ALEXANDRINA TAYLOR.

Witnesses:
ROBERT W. HARDIE,
JNO. M. RITTER.